July 16, 1963

D. SCIAKY 3,098,187

CONTROL SYSTEM

Filed Dec. 24, 1959

INVENTOR.
David Sciaky
BY Mueller & Aichele
Attys.

July 16, 1963 D. SCIAKY 3,098,187
CONTROL SYSTEM
Filed Dec. 24, 1959 4 Sheets-Sheet 2

INVENTOR.
David Sciaky
BY Mueller & Aichele
Attys.

July 16, 1963 D. SCIAKY 3,098,187
CONTROL SYSTEM
Filed Dec. 24, 1959 4 Sheets-Sheet 3

INVENTOR.
David Sciaky
BY Mueller & Aichele
Attys.

United States Patent Office 3,098,187
Patented July 16, 1963

3,098,187
CONTROL SYSTEM
David Sciaky, Chicago, Ill., assignor to Welding Research, Inc., Chicago, Ill., a corporation of Illinois
Filed Dec. 24, 1959, Ser. No. 861,983
16 Claims. (Cl. 318—162)

This invention relates generally to automatic positioning systems and more particularly to a numerical control system including a reader on which a program may be set up and which controls a counter and positioning apparatus to automatically position a member in successive positions defined by numerical counts for the performance of desired operations.

There are many applications wherein it is desired to accurately position a member in various positions in sequence. For example, in drilling or machining operations it may be desired to hold a workpiece on a table and move the table and/or a tool in one or more directions to various successive positions with respect to each other to perform the desired work on the piece. Such a system must be reliable and accurate in operation and must be easily set up to identify the various positions to be located. The system must operate rapidly and yet come to a stop at an extremely accurate position.

Systems which are available have depended upon the measurement of a voltage or other quantity which is subject to errors and the resulting operation has not been completely accurate. These systems include complex counters and other equipment and the resulting equipment is extremely expensive. These systems have also been objectionable as they are quite difficult to set up.

It is therefore an object of the present invention to provide an improved numerical control system.

Another object of the invention is to provide a control system wherein each increment of movement is registered as a discrete step to provide extremely accurate control.

A further object of the invention is to provide a positioning control system including multiple element counter tubes for registering the movement of the element being positioned.

Another object of the invention is to provide a numerical positioning system which causes relatively fast movement of the item to be positioned, wtih the movement automatically slowing and then accurately stopping at a predetermined position.

A still further object of the invention is to provide a positioning system which responds to pulses produced by each increment of movement of the part being positioned with a counting device to register the pulses and stop the movement when a predetermined number of increments of movement have taken place.

Still another object of the invention is to provide a positioning system wherein a counter is referenced to a zero position and controls the movement to various desired positions while maintaining a continuous reference to the zero position to thereby eliminate accumulated errors resulting from a plurality of positioning operations.

A still further object of the invention is to provide a positioning system controlled by a reader which responds to a program or memory device which controls a plurality of operations in sequence.

A feature of the invention is the provision of a control system including a device coupled to a member which is to be positioned, which produces a pulse in response to each increment of movement of the member and apparatus responsive to the pulse to register and control the position of the member.

A further feature of the invention is the provision of a numerical control system including multiple electrode counter tubes responsive to pulses produced by movement of a member with a plurality of tubes connected in cascade and coupled to a coincident circuit so that the coincident circuit operates when all of the tubes are at the preset positions. The tubes may be coupled to the coincidence circuit through a matrix which may be electrically preset to desired position.

Another feature of the invention is the provision of a positioning system having a lead screw which positions a member, to which a perforated disk is coupled, with photo electric devices producing pulses as the perforations permit light to pass therethrough, and a counter to which the pulses are applied and which stops the operation of driving means for the lead screw when a predetermined number of pulses have been received.

A still further feature of the invention is the provision of a control system wherein a motor causes rapid positioning movement which is controlled by a main counter and slow motion controlled by an auxiliary counter, so that the motor can be slowed down prior to its reaching the final position and accurately stopped at the desired position.

Still another feature of the invention is the provision of a control unit or reader which includes a plurality of switches with actuating elements extending therefrom, and a perforated tape positioned to be engaged by the actuating elements and causing actuation thereof except when the elements extend through perforations in the tape. The switches may control the setting of a counter and/or the operation of a control circuit for controlling the operation of a numerical control system.

The invention is illustrated in the accompanying drawings wherein.

In practicing the invention there is provided a numerical control system for controlling the positioning of a table or the like which may be moved in a plurality of directions. The lead screw controlling movement in one direction has attached thereto a disk with openings therein through which light passes. Photo electric devices respond to the light passing through the openings to provide a pulse corresponding to each incremental movement of the table. These pulses are applied through a pulse forming circuit to a counter which, may include a plurality of dekatrons. The dekatrons may be connected to a coincidence circuit through a matrix coupled to a reader or program unit. The reader provides interconnections to the matrix so that a pulse is applied to the coincidence circuit when each dekatron reaches a particular position. Alternately, a desired position may be set up by manual controls. The coincidence circuit is coupled to a function transfer circuit which in turn controls a motor, clutch and brake for driving the lead screw, to cause the motor to move at a fast rate, a slow rate or to stop and to fix the position of the table. A sequence circuit is provided which may be controlled by manual controls and/or by signals from the reader. This causes the system to start with the main counter controlling the movement until a predetermined point is reached when the main counter operates through the function transfer circuit to cause the motor to slow down. At the same time an auxiliary counter is actuated to determine the extent of slow movement, and which operates through the function transfer circuit to stop the motor. The sequence circuit may be operated through the reader to cause initial fast or slow operation, operation in either direction, and other desired operations. The reader may be controlled by a perforated tape and may include a plurality of switches actuated or not depending upon the position of the perforations in the tape. Position control may be provided for one or more directions of movement with operation in all directions being controlled by the same reader and sequence circuit.

Figure 1:
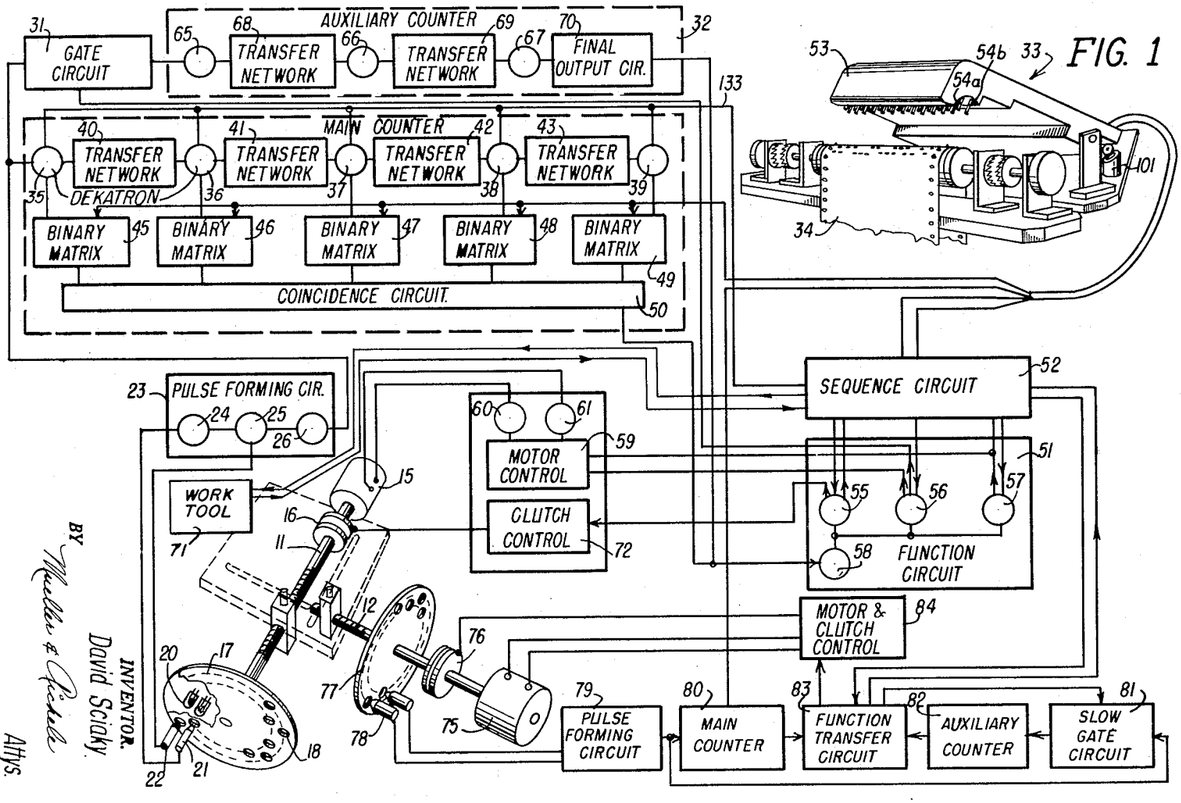
FIG. 1 is a schematic diagram of the system with the various parts shown in block diagram form.

Referring now to the drawings, in FIG. 1 there is shown the overall numerical positioning system of the invention. A table 10 is mounted for movement in a first direction by operation of lead screw 11 and for movement in a second direction at right angles thereto by operation of the lead screw 12. It will of course be necessary to mount the table so that movement in one direction is not restricted by movement in the other direction. It is obvious that various directions of movement may be provided and either rotary or linear movement may be controlled.

The lead screw 11 is operated by motor 15 through clutch 16. Connected to the lead screw 11 is a disk 17 having openings 18 therein. The openings are arranged in two rows with the same number of openings being provided in each row and the openings being intermediately spaced with respect to each other. A light source 20 provides light which passes through the disc to actuate photo diodes 21 and 22.

The pulses produced by the photo diodes 21 and 22 are applied to a pulse forming circuit 23. This may include a multivibrator having two stages 24 and 25 to which the voltages from the diodes 21 and 22 are applied respectively. In this circuit the stage 24 may be energized by a pulse to cut off stage 25, and stage 25 may be energized by a pulse to cut off stage 24. An output stage 26 is provided for producing a pulse when one of the stages, as stage 25, is rendered conducting. In this system, a single pulse is provided by the circuit for each increment of movement between a pair of openings in the same row even though the disk may move back and forth in a manner so that light through an opening may cause the diode associated therewith to produce more than one pulse. This is because the multivibrator will not change state in response to additional pulses from the diode which produces a first state until a pulse has been produced from the second diode to cause the multivibrator to change to the second state. The pulses from output stage 26 are applied to the main counter 30 and to a gate circuit 31 which is actuated to apply the pulses to the auxiliary counter 32 during slow movement of the lead screw 11. It will be obvious that other arrangements can be used to provide pulses in response to discrete increments of movement of a member being positioned. For example, magnetic masses on a moving disc may excite a coil to produce pulses therein, in a manner generally equivalent to the excitation of a photo diode by the light passing through openings in the disc.

Considering now the main counter, this is shown including five dekatron tubes 35, 36, 37, 38 and 39. The tubes are coupled so that the tube 35 will shift its firing from one cathode to the next in response to each pulse from the circuit 23. The dekatron tube 35 is coupled to the next dekatron 36 through a transfer network 40 so that when the dekatron 35 has completed a cycle of ten pulses, a pulse will be applied to the dekatron tube 36. Similarly transfer networks 41, 42 and 43 apply pulses to the dekatron tubes 37, 38 and 39 so that dekatron tube 37 transfers firing from one cathode to another after every hundred pulses, dekatron tube 38 transfers firing after every thousand pulses, and dekatron tube 39 transfers firing after evey ten thousand pulses. Each pulse represents an increment of movement which may be any desired amount depending upon the coupling of the disk 17 to the lead screw 11 or other moving device, and depending on the number of perforations in the apertured disc.

The dekatron tubes 35 to 39 inclusive are coupled through matrices 45, 46, 47, 48 and 49 respectively to a coincidence circuit 50. Each matrix is arranged so that it may be set up to provide a signal to the coincidence circuit when the dekatron tube associated therewith reaches a desired preset position. The matrix is controlled by connection to the reader device 33 which responds to a perforated tape 34 as will be further explained. Although each of the first four dekatron tubes will pass by its present position on each cycle of operation, the coincidence circuit is not actuated until all of the dekatrons are simultaneously at the preset positions. When this happens a control is applied to the function transfer circuit 51 as will be described in greater detail.

The system as a whole is controlled by a sequence circuit 52. This may include manual controls for initiating operation and for providing various desired operations. The sequence circuit is coupled to the function transfer circuit 51 to control operation thereof. The sequence circuit is also coupled to the reader 33 to obtain controls therefrom and to provide controls thereto. The sequence circuit causes the reader head 53 to move up and down to permit movement of the tape 34 to various positions. The reader head includes a plurality of switches having actuating members 54 extending therefrom. When the reader head is moved down the actuating members 54 will engage the tape 34 to cause actuation of the switches coupled thereto. However, when the tape is perforated at a position which coincides with an actuating member, the member will extend through the perforation and will not actuate the switch in the head.

Before operation of the system is started the table must be placed in a zero or origin position to which the various positions identified by the tape are referenced. The zero position may be at any place desired. Although it is possible to retain the same zero position for many positioning operations, it may be desired to reset the origin if extensive movement is desired which would require more counting stages than would be otherwise required.

When an operation in initiated the squence circuit will cause the reader head to come down to provide the desired controls. This will cause operation through the sequence circuit 52 and transfer circuit 51. The function transfer circuit includes control sections providing stop, fast and slow operation of the motor 15. Before operation starts the stop section 55 is actuated. The fast section 56 and the slow section 57 will cause fast or slow operation of the motor depending on which is operative.

Assuming that the tape has been perforated to call for fast action, the fast section 56 will energize the motor 15 through the motor control circuit 59 and the thyratron tubes 60 and 61. The motor control circuit may be of known construction. This will cause rotation of the lead screw 11 and the disk 17 to apply pulses to the main counter 30. This operation will continue until the main counter reaches its preset position as controlled by the matrix circuits 45 to 49 inclusive which are in turn controlled by the reader through the action of the perforations in the tape. When a preset position is reached the coincidence circuit will apply a pulse to the commutator 58 to transfer action from the fast section 56 to the slow section 57.

The slow section 57, operates through the motor control circuit 59 and the thyratrons 60 and 61 to cause operation of the motor 15 at a slow speed. Dynamic braking may be used to rapidly change from fast to slow speed. The fast section 56 actuates the gate circuit 31 so that pulses from the pulse forming circuit 23 are not applied through the gate. However, when the fast section is released and the slow section 57 actuated, pulses are applied through gate circuit 31 to the auxiliary counter 32.

The auxiliary counter is illustrated as including three dekatron tubes 65, 66 and 67. Pulses from the tube 65 are applied through transfer network 68 to the dekatron tube 66 and through the transfer network 69 to the dekatron tube 67 in the same manner as described in connection with the main counter. Inasmuch as three dekatron tubes are illustrated, it is possible to provide a count of nine hundred ninety-nine pulses in the auxiliary circuit. The number of pulses to be received by the auxiliary counter prior to stopping of movement may be a fixed number and may be determined by the initial resetting of the dekatron tubes. A connection is provided from the final output circuit 70 of the dekatron tube 67 to the commutating tube 58 which applies a pulse thereto when the auxiliary counter has counted back to the zero position. This will cause the function transfer circuit to transfer conduction from the slow section 57 to the stop section 55.

The stop section 55 operates clutch control 72 to disengage the clutch 16 to thereby stop the motion of the lead screw 11. Inasmuch as the slow section 57 has been de-energized the motor will also be de-energized through the motor control circuit. This may provide breaking action to the motor. A break may also be provided to stop movement of the lead screw or table when the stop section is actuated.

After the movement has been stopped by action of the function transfer circuit, the stop section 55 thereof also applies a control to the sequence circuit so that this may provide the desired further operation. For example, the sequence circuit may control the operation of a tool to cause the tool to perform some work on an object on the table 10. This may be a drill which drills a hole in a member carried by the table 10 at the position which has been determined by the operation of the counter. More than one type of work can be performed at each position as required. The sequence circuit may be operated by the tool when the work is completed and may in turn actuate the reader 33 so that the next position of the tape is brought into action to control the next positioning operation. The operation of the reader, of course, will require that the head 53 be raised while the tape is moved and then lowered again to control the desired operation.

As previously stated a second lead screw 12 may be provided for moving the table 10 in a second direction, or for moving a tool with respect to the table. This lead screw may be actuated by motor 75 through clutch 76. A disk 77 is provided on the screw 12 which may be identical to the disk 17. This has openings which cause light to strike photo diodes 78 to actuate the pulse forming circuit 79. The pulse forming circuit may apply pulses to a main counter 80 and through a gate circuit 81 to an auxiliary counter 82. A function transfer circuit 83 is provided and controls the motor and clutch control circuit 84 which in turn controls the motor 75 and clutch 76. These elements may be identical to the corresponding elements which have been described in connection with control of the motor 15 which drives the lead screw 11.

The sequence circuit 52 may cause operation of the two systems simultaneously so that the table 10 will move in both directions at the same time. It will be obvious that more than two systems may be used to control movement in additional directions. In such case, movement may be complete in one direction before it is in the other directions, and when one lead screw completes its movement it will rest until the other screw has completed its movement. After the movements have been completed in all directions, the sequence circuit will cause operation of whatever work is to be performed.

Figures 2, 3, 4:
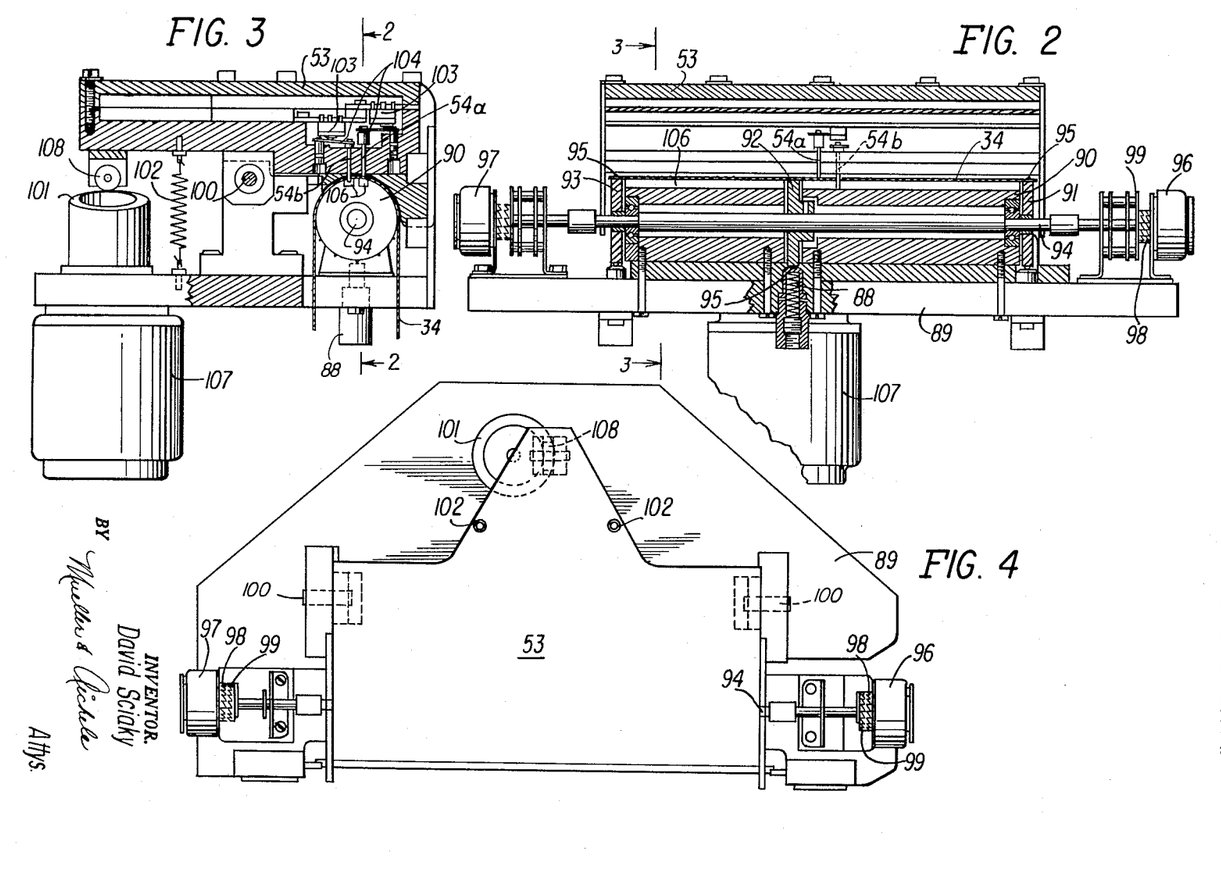
FIG. 2 is a view partly in cross section of the reader device.
FIG. 3 is a cross section view along lines 3—3 of FIG. 2 of the reader device.
FIG. 4 is a top view of the reader device illustrated in FIGS. 2 and 3.

The construction of the reader or program device 33 is shown more particularly in FIGS. 2, 3 and 4. The tape 34 is positioned over a fixed cylindrical support 90 mounted on the base 89. The tape is positioned by sprockets 91, 92 and 93 which are mounted on shaft 94. The sprockets have pins 95 extending therefrom into openings in the tape 34 to accurately position the tape in the reader. The sprockets 91, 92 and 93 are held in predetermined positions so that the tape will be properly aligned in the reader by a detent 88 cooperating with sprocket 92. The detent engages a pin 95 positioned generally opposite to the active position of the tape. Further detents may be provided engaging sprockets 91 and 93 if desired. The sprockets are driven through shaft 94 by rotary solenoid devices 96 and 97. These may be arranged to drive the sprockets in opposite directions so that the tape can be fed either forward or backward. The solenoid devices each include a toothed member 98 which engages a corresponding toothed member 99 coupled to the shaft 94, with engagement being provided only when the solenoid devices are energized to rotate the shaft. This leaves the shaft free to be rotated in either direction by either solenoid device which may be energized. The solenoid devices 96 and 97 may also have detents to fix their positions.

The reader head 53 is pivoted at 100 to the base 89. The reader head is actuated by a cam 101 operating against springs 102. The cam 101 is driven by motor 107, and a cam follower 108 mounted on the back of the reader head is held in engagement with the cam surface 101 by action of the springs 102. As shown in FIG. 3 the front of the reader head is down, and it will be apparent that when the cam 101 rotates through 180 degrees, the springs will pull the front of the head up.

At the front of the head are mounted a plurality of switches 103 actuated by resilient arms 104 to which are connected pins 54. The switches may be of the type known as microswitches and may be connected in a circuit provided by a printed board. This facilitates providing the circuit in the reader head. When the front of the head is pivoted upwardly by action of springs 102 the arms 104 hold the pin 54 downward and the switches 103 are in the unactuated position. The head is moved by rotation of the cam 101, and when this moves to the position shown in FIG. 3 the front of the head moves downwardly so that the pins 54 engage the tape 34. When a pin is positioned to correspond to a perforation in the tape 34 its actuating pin will extend through the perforation and the switch will not be actuated. The cylindrical support 90 has recesses 106 to receive the pins 54. However, when there is no perforation corresponding to the position of the pin, the pin will strike the tape which will stop its movement so that the arm 104 coupled thereto will flex and actuate the switch 103. In FIGS. 2 and 3 the pin 54a is shown in engagement with the tape 34 to actuate its switch, and the pin 54b is shown extending through the aperture so that its switch will not be actuated.

Figure 5:
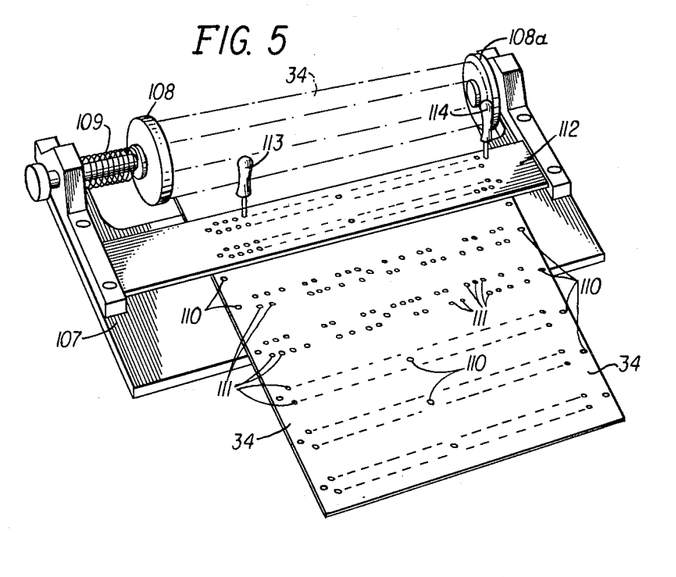
FIG. 5 shows a section of the tape used in the reader and a punch for perforating the tape.

FIG. 5 shows a section of the tape and a punch for perforating the same. The tape 34 has two rows of sprocket holes 110 along the two edges and a third row slightly displaced to the left of the center. Perforations or openings 111 for actuating the switches 103 are also shown and these are provided in groups each including two rows of openings inasmuch as two rows are required for control of the two rows of switches in the reader head. It will be apparent that a reader could be provided with only a single row of switches or with more than two rows and the tape would then be perforated accordingly. In the system disclosed the two rows of switches in the reader head may provide control of the two directions of movement of the table 11 (FIG. 1). As previously stated, the switches in the reader head control the matrix, and the manner of control will be further described, and also control various operations of the sequence circuit 52 as may be required in the operation of the system.

The tape 34 may be made of a material known in the trade as "Mylar" or may be made of any other suitable material. The material must be flexible but very sturdy. The number of openings across the width of the tape depend upon the number of switches necessary to provide the desired controls. In an embodiment which has been constructed forty openings are provided in each row so that eighty openings are provided for each setting, with eighty switches being provided in the reader head to be controlled by the tape.

The punch for perforating the tape, shown in FIG. 5, includes a base 107 having upright brackets supporting spindles 108 and 108a. The tape 34 is supported between the spindles with the spindle 108 being biased by spring 109 to hold the tape firmly in position therebetween. A die plate 112 is spaced from the base to allow the tape to extend therebetween. The die plate 112 has openings therein positioned to correspond to the sprocket holes 110 and to the switch actuator receiving apertures 111 of the tape. The base 107 is also perforated in alignment with the die plate 112 so that a punch may extend through the openings in both the die plate and the base and provide a clean opening through the tape.

A punch 114 is shown in an aperture in plate 112 which corresponds to a sprocket hole. This punch may be allowed to remain in this opening while punch 113 forms the other openings of the same group, so that they will all be properly positioned with respect to each other and with respect to the sprocket holes. This will insure accurate positioning of the openings. Although a hand punch is illustrated, it is obvious that the punches may be operated by solenoids or other devices which may be controlled by keys or the like, so that the punching operation may be more easily performed.

Figure 6:
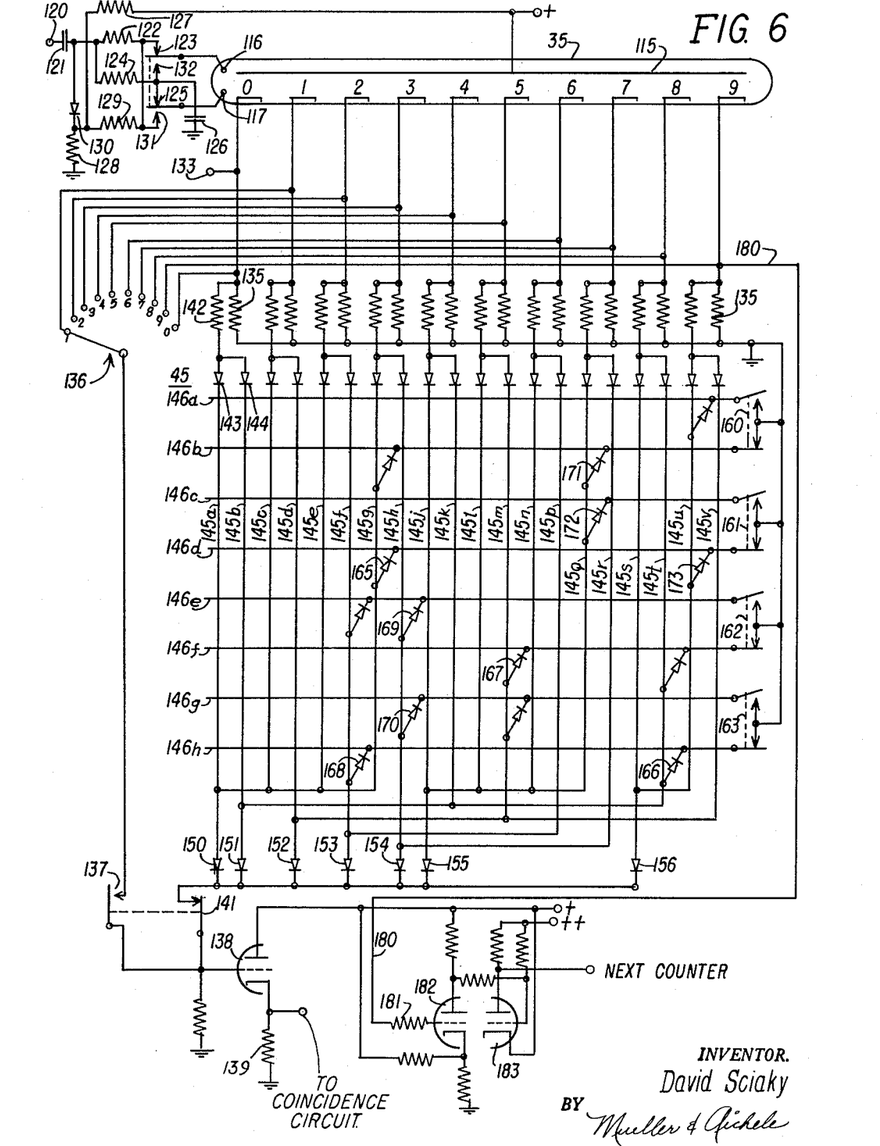
FIG. 6 is a partial schematic diagram illustrating a representive circuit for a dekatron tube stage, including the matrix and pulse transfer circuit.

In FIG. 6 there is illustrated the circuit of one dekatron tube such as the dekatron tube 35, with the binary matrix for controlling the coupling from the tube to the coincidence circuit, and the transfer network for applying pulses to the next dekatron tube. The dekatron tube is of standard construction and includes ten cathodes numbered from zero to nine, a plate 115 and guide pins 116 and 117. It is to be pointed out that a pair of guide pins 116 and 117 are provided between each adjacent pair of cathodes and these transfer the firing from one cathode to another in a known manner. The pins 116 are all connected together and the pins 117 are connected together and all are represented by the single pair. When the guide pin 116 is first energized and then the guide pin 117 is later energized, the firing will be transferred from a cathode to a next higher numbered cathode as from cathode 0 to cathode 1. When pin 117 is energized before pin 116 the firing will be transferred to a lower numbered cathode such as from cathode 2 to cathode 1.

The pulses from the pulse forming circuit 23 are applied through conductor 120 to the guide pins 116 and 117. The circuit to pin 116 extends through capacitor 121, resistor 122 and closed relay contacts 123. Resistors 127 and 128 form a voltage divider for providing a reference potential applied through resistor 129 to this circuit. The same pulse will be applied to pin 117 through capacitor 121, resistor 124 and closed contacts 125. Capacitor 126 is connected to this circuit and acts to delay the pulse applied to pin 117 so that this pulse will occur later than the pulse applied to pin 116. This will cause the firing to shift from one cathode to a next higher cathode. The diode 130 is provided to permit rapid discharge of capacitor 121 for high speed operation. When the relay contacts 123 and 125 are opened and contacts 131 and 132 are closed, the circuit to the guide pins 116 and 117 are transposed. A relay including the contacts 123, 125, 131 and 132 may be controlled by the sequence circuit when the positioning movement is reversed. This applies the pulse to pin 117 before it is applied to pin 116 to cause reverse firing of the dekatron tube 35 for following reverse operation of the motor.

A connection is made through conductor 133 to the zero cathode of the tube to cause this cathode to fire to establish the reference position for the tubes. This is controlled through the sequence circuit 52 so that all of the dekatron tubes in the main counter may be set at the zero position when operation is initiated.

Selector switch 136 can be used to manually set a number at which the dekatron tube will provide a signal to the coincidence circuit to provide a desired operation. For manual operation contact 137 is closed and contact 141 is opened. These contacts may be part of a relay in the sequence circuit 52. Each cathode of the dekatron tube is connected through a resistor 135 to ground. Accordingly when a particular cathode fires a positive potential will be developed across its cathode resistor. The cathodes one through zero respectively are connected to contacts one through zero respectively of selector switch 136 so that the potential from a selected cathode may be applied through the selector switch 136 and through contact 137 to the grid of tube 138. This causes tube 138 to be rendered conducting and a potential to be developed across its cathode resistor 139. This potential is applied to the coincidence circuit 50 to actuate the function control circuit.

For automatic operation the potential from an energized cathode may be applied to render the tube 138 conducting through the matrix circuit 45. When the operation through the matrix circuit is desired, contact 137 connecting the selector switch 136 will be opened, and contact 141 will be closed to apply the voltage from the matrix to the tube 138. The input circuits to the matrix from the cathodes include resistors 142 connected to the individual cathodes and with each cathode being connected through diodes 143 and 144 to two vertical conductors. There are therefore twenty vertical conductors in the matrix, numbered 145a through 145v, which are energized in pairs as the individual cathodes ionize. The vertical conductors will apply a voltage through one of the diodes 150 to 156 when a particular cathode is ionized depending upon the grounding of the horizontal conductors of the matrix, numbered 146a to 146h, through switches 160, 161, 162, and 163. The switches 160 to 163 are four of the switches 103 in the reader and each has a normally open contact and a normally closed contact. By the operation of these four switches, the particular cathode of the dekatron tube 35 which will cause conduction of tube 138 is set.

With all of the switches 160 to 163 unactuated, all of the vertical conductors 145 are grounded through the normally closed contacts of the switches so that there will be no voltage applied to the tube 138. The circuit will be traced with the switch 160 operated and the remaining switches unactuated to show that a pulse from one of the cathodes is applied to the tube 138. This is provided by punching the tape at the positions of the actuators for switches 61, 62 and 63 so that the actuators will extend through the openings. The tape will not be punched at the position of the actuator for switch 160 so that this switch will be actuated by the tape.

With the switches as shown, vertical lines 145a, 145c, 145e and 145g, which are connected together, will be grounded through diode 165 connected from line 145g through horizontal line 146d to the closed contact of switch 161. The vertical lines 145b, 145k and 145t will be grounded through line 145t and diode 166 connected to the horizontal line 146h grounded through the closed contact of switch 163. The vertical lines 145d, 145m, and 145v will be grounded by line 145m connected through diode 167 and horizontal line 146f to the closed contacts of switch 162. The vertical lines 145f and 145p will be grounded through diode 168 connected to the horizontal line 146h grounded through the normally closed contacts of switch 163. The vertical lines 145h and 145r are not grounded as diodes 169 and 170 are connected from line 145h to horizontal lines 146e and 146g, which are connected to open contacts of switches 162 and 163 respectively. Vertical lines 145j, 145l, 145n and 145q which are connected together are also not grounded inasmuch as the diodes 171 and 172 connected from line 145q to horizontal lines 146c and 146b are in turn connected to open contacts of switches 160 and 161, in the condition stated. Vertical lines 145s and 145u are grounded through diode 173 connected from line 145u to horizontal line 146d which is connected to the closed contact of switch 161.

Accordingly vertical lines 145q and 145r are the only pair of lines extending from a single cathode which are ungrounded. Although in some cases one of the lines is ungrounded, in each case the other line is grounded so that the potential of the cathode is developed across the resistors 142 and no potential is available at the output of the matrix. However the potential from cathode 7 on lines 145q and 145r will be applied through diodes 155 and 154 and through closed contact 141 to the grid of tube 138 to cause this tube to fire to apply a voltage to the coincidence circuit. By other operations of the switches 160 to 163 each of the cathodes can be individually coupled to the coincidence tube 138.

When the matrixes 45, 46, 47, 48 and 49 all apply a potential to the output tube thereof at the same time, the coincidence circuit will produce a pulse which is applied to the commutator element 58 to transfer the control from one section to the next of the function circuit. The five matrix circuits may all be the same and each will be controlled by four switches in the reader corresponding to switches 160 to 163 inclusive. This will require 20 switches controlling the matrix circuits for each direction of movement in the positioning system.

As previously stated, after each dekatron tube completes a sequence of firing the next tube will transfer firing by one step. That is after tube 35 transfers glow ten times, the tube 36 will transfer glow once. This is accomplished through the transfer networks 40, 41, 42 and 43 of the main counter and the transfer network 68 and 69 of the auxiliary counter. The transfer circuit 40 is illustrated in FIG. 6 and is operated through conductor 180 coupled to the #9 cathode of the tube 35. This applies a positive potential, when the #9 electrode is ionized, through resistor 181 to the grid of tube 182. This renders tube 182 conducting so that the voltage at its plate reduces to cut off the tube section 183. The voltage at the plate of tube 183 will therefore increase to produce a positive pulse which is grounded through diode 130 and resistor 128 of the next dekatron tube. When the tube 183 again becomes conductive, after tube 182 ceases conducting when the glow transfers from the #9 cathode, a pulse is produced which causes the next dekatron tube to transfer its glow.

Figure 7:
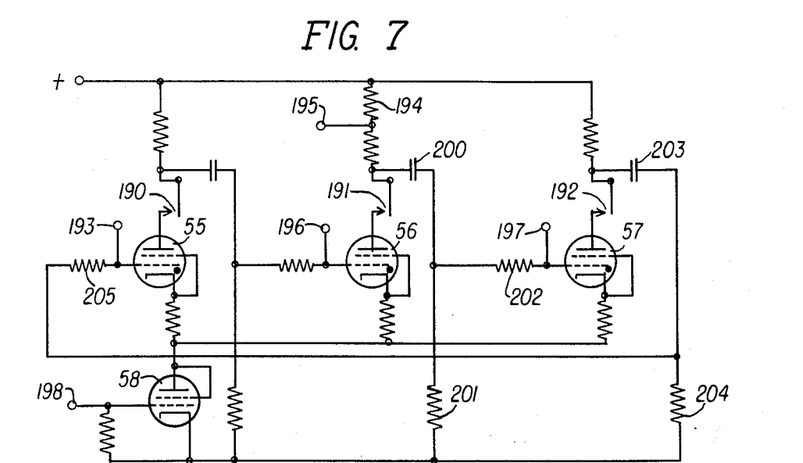
FIG. 7 is a circuit diagram of the function transfer circuit.

The function circuit 51 of FIG. 1 is shown more in detail in FIG. 7. The sections providing stop, fast, and slow operation are formed by thyratron tubes, and the commutator section 58 is formed by a vacuum tube. These tubes are numbered in FIG. 7 to correspond to the numbering in FIG. 1. In the anode circuit of thyratron 55, which forms the stop section, is a switch 190 to energize this stage for operation. This switch is controlled by the sequence circuit 52 and may be the contact of a relay provided in the sequence circuit. Similarly the anode of thyratron tube 56, which forms the fast section, is energized through contact 191 controlled by the sequence circuit, and the tube 57, which forms the slow section is selectively energized by contact 192, controlled by the sequence circuit.

In the initial condition the contact 190 will be closed and the contacts 191 and 192 open, and the stop tube 55 will fire. This will cause a positive potential on its first grid which is applied from terminal 193 to the clutch control circuit 72 to deenergize the clutch 16 so that the motor 15 will be disconnected from the lead screw 11.

If the program from the reader calls for fast operation of the motor the contacts 191 will close and the contacts 190 and 192 will open, and the thyratron tube 56 will fire. Conduction in the tube 56 produces a voltage drop across resistor 194 and provides a voltage at terminal 195 which is applied to the motor control circuit 59 to cause fast operation of the motor. A voltage is also developed at the grid of tube 56 which is applied from terminal 196 to the gate circuit 31 to hold the gate closed. This prevents pulses from circuit 23 being applied to the auxiliary counter 32 during fast operation of the system.

Similarly, if low speed operation is desired, the sequence circuit operates to close contacts 192 and open contacts 190 and 191. This causes thyratron 57 to conduct to provide a positive potential on its first grid which is applied through terminal 195 to the motor control circuit to cause operation of the motor at slow speed. As the thyratron tube 56 for fast action has dropped out, the gate voltage is removed so that pulses are applied to the auxiliary counter 32.

Conduction of the tubes 55, 56 and 57 may also be controlled by the commutator tube 58 to cause conduction to shift from one tube to the next in sequence. Pulses from the coincidence circuit 50 of the main counter, and from the final output circuit 70 of the auxiliary counter, are applied to terminal 198 connected to the grid of the tube 58 to cut off this tube to provide the commutation action. When the tube 58 is cut off, any one of the tubes 55, 56 or 57 which is conducting will be cut off. If tube 56 was conducting, when it is cut off the voltage on its plate rises and causes a pulse to be developed across resistor 201 through capacitor 200. This pulse will be applied through resistor 202 to the grid of tube 57 to render this tube conducting to provide slow action.

When the tube 56 is cut off the voltage at terminal 195 increases and this is applied to the motor control to release the fast action. Similarly the voltage at point 196 drops so that the gate 31 is allowed to open to apply pulses to the auxiliary counting circuit. At the end of the auxiliary count, the pulse from the output circuit 70 again cuts off the tube 58 to transfer the conduction from tube 57 to tube 55. When the tube 57 is cut off a pulse is developed through capacitor 203 across resistor 204, and applied through resistor 205 to the grid of tube 55 to render this tube conducting to stop the operation. When tube 55 conducts the clutch is disengaged by action of the voltage appearing at terminal 193, and as the tube 57 no longer conducts the voltage at terminal 197 falls so that the motor control circuit stops the motor.

As previously stated, after the movement of the work table 10 has stopped, the sequence circuit 52 may cause a work tool such as a drill to operate on the work piece on the work table. This is illustrated in block form in FIG. 1 by the work tool 71. This may be any automatic tool and not necessarily a drill. The automatic tool may cause operation of the sequence circuit when the work is completed so that the next sequence starts, with the reader 33 operating to position the tape to the next position.

The system in accordance with the invention therefore provides an extremely accurate numerical positioning control. As operation is controlled by pulses which are produced by discrete movements of the member being positioned, there is no problem of inaccuracy resulting from the metering of a voltage or other quantity. By using dekatron counter tubes the number defining the position is accurately counted and the position is always apparent. The arrangement whereby fast movement is followed by slow movement makes it possible to use relatively fast movement so that the overall positioning takes place quickly and accurate final positioning is accomplished without over run since the movement is slow prior to stopping.

The system makes it possible to set up a plurality of programs by the use of punched tape, and by using a wide tape so that all of the operation can be registered at a single time, the tape constitutes the only memory required. A number of different positions, with various operations performed at the positions, can be controlled by the tape and the system retains a reference back to a single point so that there is no accumulation of errors. Positioning can be accomplished simultaneously in a plurality of direction if this is desired.

I claim:

1. A system for controlling the positioning of a member acted upon by work means including in combination, means for moving the member, pulsing means producing a pulse in response to each increment of movement of the member, counter means responsive to pulses and including means for presetting a predetermined count, means coupling said pulsing means to said counter means to apply pulses thereto, program means coupled to said counter means and controlling said presetting means thereof to set up counts corresponding to a plurality of positions, control means for controlling operation of said moving means, and sequence means coupled to said program means and said control means, said sequence means actuating said program means to set up a preset count and thereafter causing said control means to initiate operation of said moving means, with said pulsing means applying pulses to said counter means upon each increment of movement of said member, said counter means actuating said control means to stop said moving means when a first preset count is reached, said sequence means causing operation of the work means when said moving means stops and upon completion of the operation of the work means again actuating said program means to preset a second count in said counter means, said sequence means thereafter actuating said control means to initiate operation of said moving means to move said member, with said counter means operating to stop such movement at the end of the second count.

2. A system for controlling the positioning of a member acted upon by work means including in combination, means for moving the member, pulsing means producing a pulse in response to each increment of movement of the member, counter means responsive to pulses and including means for presetting a predetermined count, means coupling said pulsing means to said counter means to apply pulses thereto, program means coupled to said counter means and controlling said presetting means thereof to set up counts corresponding to a plurality of positions, control means for controlling operation of said moving means, and sequence means coupled to said counter means, said program means and said control means, said sequence means acting to set said counter means to a reference position, actuating said program means to set up a preset count and thereafter causing said control means to initiate operation of said moving means, with said pulsing means applying pulses to said counter means upon each increment of movement of said member, said counter means actuating said control means to stop said moving means when a first preset count is reached, said sequence means causing operation of the work means when said moving means stops and upon completion of the operation of the work means again actuating said program means to preset a second count in said counter means, said sequence means thereafter actuating said control means to initiate operation of said moving means to move said member, with said counter means operating to stop such movement at the end of the second count.

3. A system for controlling the positioning of a member including in combination, means for moving the member, pulsing means producing a pulse in response to each increment of movement of the member, main counter means responsive to pulses and including means for presetting a predetermined count, auxiliary counter means responsive to pulses and operating after a given number of pulses are applied thereto, means coupling said pulsing means to said main counter means to apply pulses thereto, gate means for selectively applying pulses to said auxiliary counter means, program means coupled to said counter means and controlling said presetting means thereof to set up a desired count, control means for providing fast, slow and stop operation of said moving means, and sequence means coupled to said program means and said control means, said sequence means actuating said program means to set up a preset count and thereafter causing said control means to initiate fast operation of said moving means, with said pulsing means applying pulses to said main counter means upon each increment of movement of said member, said main counter means actuating said control means to cause slow operation of said moving means when the preset count is reached, said gate means applying pulses to said auxiliary counter means during slow operation of said moving means, said auxiliary counter means actuating said control means to stop said moving means when said given number of pulses is received.

4. A system for controlling the positioning of a member to be acted upon by work means including in combination, means for moving the member, pulsing means producing a pulse in response to each increment of movement of the member, counter means responsive to pulses and including means for presetting a predetermined count, means coupling said pulsing means to said counter means to apply pulses thereto, program means coupled to said counter means and controlling said presetting means thereof to set up a desired count, and control means coupled to said counter means, said program means and said moving means for controlling the operation thereof, said control means actuating said program means to set up a preset count and responding thereto to initiate operation of said moving means, said counter means responding to pulses produced upon each increment of movement of said member to actuate said control means to stop said moving means when a preset count is reached, said control means causing operation of the work means when said moving means stops.

5. A system for controlling the positioning of a member including in combination, means for moving the member, pulsing means responsive to movement of the member and producing a pulse in response to each increment of movement, counter means responsive to pulses and including means for presetting a predetermined count, means coupling said pulsing means to said counter means to apply pulses thereto, program means coupled to said counter means and controlling said presetting means thereof to set up counts corresponding to a plurality of positions, and control means coupled to said program means and to said moving means for controlling the operation thereof, said control means actuating said program means to set up a preset count and initiating operation of said moving means, with said pulsing means applying pulses to said counter means upon each increment of movement of said member, said counter means actuating said control means to stop said moving means when a first preset count is reached, said control means causing operation of auxiliary equipment when said moving means stops and upon completion of the operation of the auxiliary equipment again actuating said program means to preset a second count for said counter means, said control means thereafter initiating operation of said moving means to move said member to a second position under control of said counter means.

6. A system for controlling the positioning of a member including in combination, means for moving the member, pulsing means producing a pulse in response to each increment of movement of the member, counter means responsive to pulses, automatic program means coupled to said counter means for presetting the same to any one of a plurality of predetermined positions corresponding to different desired counts, means coupling said pulsing means to said counter means to apply pulses thereto upon each increment of movement of said member, and control means coupled to said counter means and to said moving means, said control means causing fast and slow operation of said moving means and stopping the same, said counter means actuating said control means to cause said moving means to change from fast to slow movement when said counter means reaches said predetermined position set by said program means and to cause said moving means to stop when a predetermined additional number of pulses are applied to said counter means.

7. A system for controlling the positioning of a member including in combination, means for moving the member, pulsing means producing a pulse in response to each increment of movement of the member, counter means responsive to pulses and including a plurality of stages representing digits of a number, each of said stages having a plurality of terminals selectively energized as pulses are applied to said counter means, coincidence means adapted to be energized in response to simultaneous energization of one of said terminals of each of said stages, automatic program means for selectively connecting said coincidence means to said terminals of said stages so that said coincidence means is energized in response to a predetermined count, means coupling said pulsing means to said counter means to apply pulses thereto upon each increment of movement of said member, and control means coupled to said coincidence means and to said moving means, said control means causing operation of said moving means and stopping the same, said coincidence means actuating said control means to cause said moving means to stop when the connected terminals of all of said stages are simultaneously energized.

8. A system for controlling the positioning of a member including in combination, means for moving the member, pulsing means producing a pulse in response to each increment of movement of the member, counter means responsive to pulses and including a plurality of stages representing digits of a number, each of said stages having a decatron tube including a plurality of terminals selectively energized as pulses are applied thereto, coincidence means adapted to be energized in response to simultaneous energization of one of said terminals of each of said stages, automatic program means for selectively connecting said coincidence means to one terminal of each stage for operating the same in response to energization of predetermined terminals corresponding to a particular count, means coupling said pulsing means to said counter means to apply pulses thereto upon each increment of movement of said member, and control means coupled to said coincidence means and to said moving means, said control means causing operation of said moving means and stopping the same, said coincidence means actuating said control means to cause said moving means to stop when the connected terminals of all of said stages are simultaneously energized.

9. A system for controlling the positioning of a member to be acted upon by work means including in combination, means for moving the member, pulsing means producing a pulse in response to each increment of movement of the member, counter means responsive to pulses and including means for presetting a predetermined count, means coupling said pulsing means to said counter means, control means coupled to said counter means and to said moving means for controlling the operation thereof, program means coupled to said counter means and to said control means, said program means including means storing information for a plurality of positioning operations and means responsive to such information for controlling said presetting means to set up predetermined counts, said control mean actuating said program means to set up a preset count and responding to said program means to initiate predetermined operation of said moving means, which said pulsing means applying pulses to said counter means upon each increment of movement of said member, said counter means actuating said control means to stop said moving means when the preset count is reached, said control means causing operation of the work means when said moving means stops.

10. A system for controlling the positioning of a member including in combination, means for moving the member, pulsing means producing a pulse in response to each increment of movement of the member, counter means responsive to pulses and including means for presetting a predetermined count, means coupling said pulsing means to said counter means, control means coupled to said counter means and to said moving means for controlling the operation thereof, and program means coupled to said counter means and to said control means, said program means including a plurality of switches having actuating elements extending therefrom and a tape positioned to be engaged by said actuating elements, said tape being perforated to receive predetermined ones of said actuating elements, with the switches having actuating elements extending through said tape remaining unactuated and the switches having actuating elements engaging said tape being actuated, certain ones of said switches being connected to said preset means to set up a desired numerical count, said control means actuating said program means to cause movement of said actuating elements into cooperative relation with said tape, at least one of said switches being connected to said control means to initiate a predetermined operation of said moving means, said counter means actuating said control means to stop said moving means when the preset count is reached.

11. A system for controlling the positioning of a member including in combination, means for moving the member, pulsing means producing a pulse in response to each increment of movement of the member, counter means responsive to pulses and including means for presetting a predetermined count, means coupling said pulsing means to said counter means, control means coupled to said counter means and to said moving means for controlling the operation thereof, and program means coupled to said counter means and to said control means, said program means including a movable head supporting a plurality of switches having actuating elements extending therefrom and a tape positioned to be engaged by said actuating elements, said tape having sections perforated to receive predetermined ones of said actuating elements, with the switches having actuating elements extending through said tape remaining unactuated and the switches having actuating elements engaging said tape being actuated, said control means actuating said program means to cause movement of said head so that said actuating elements are spaced from said tape and for moving said tape to a desired position and then moving said head so that the said actuating elements are in cooperative relation with said tape, certain ones of said switches being connected to said presetting means to set up a preset count, at least one of said switches being connected to said control means to initiate a predetermined operation of said moving means, said counter means actuating said control means to stop said moving means when the preset count is reached.

12. A system for controlling the positioning of a member including in combination, means for moving the member, apertured means moving in coordinated relation with the member and having spaced apertures therein, light means applying a beam of light on said apertured means which passes therethrough when an aperture is aligned with said light means, light sensitive means responsive to light passing through said apertures for producing pulses, whereby a pulse is produced in response to each increment of movement of the member, counter means responsive to pulses and including a plurality of stages each having a decatron tube with a plurality of cathodes, means connected to the cathodes of said decatron tube and adjustable to provide an operative connection to a single cathode of each decatron tube, means coupling said pulsing means to said counter means to apply pulses thereto to energize said cathodes of said decatron tubes in sequence, and control means coupled to said counter and to said moving means, said control means initiating operation of said moving means, said counter means actuating said control means to stop said moving means when said selected cathodes of all said decatron tubes are simultaneously energized.

13. A system for controlling the positioning of a member including in combination, means for moving the member, apertured means moving in coordinated relation with the member and having regularly spaced apertures therein, light means applying a beam of light on said apertured means which passes therethrough when an aperture is aligned with said light means, light sensitive means responding to light passing through said apertures for producing pulses, whereby a pulse is produced in response to each increment of movement of the member, counter means responsive to pulses and including a plurality of stages representing digits of a number, each of said stages including a decatron tube having a plurality of terminals energized in turn as pulses are applied thereto, presettable means coupled to said terminals and responsive to energization thereof for causing operation when a predetermined count is reached, means coupling said pulsing means to said counter means to apply pulses thereto upon each increment of movement of said member, control means coupled to said counter means and to said moving means, and program means coupled to said counter means and to said control means, said program means including a plurality of switches having actuating elements extending therefrom and a tape positioned to be engaged by said actuating elements, said tape having openings therein to receive predetermined ones of said actuating elements, with the switches having actuating elements extending through openings in said tape remaining unactuated and the switches having actuating elements engaging said tape being actuated, said control means actuating said program means to cause movement of said actuating elements into engagement with said tape, certain ones of said switches being connected to said presettable means to set up a desired numerical count, at least one of said switches being connected to said control means to initiate a predetermined operation of said moving means, said counter means actuating said control means to stop said moving means when the preset count is reached.

14. A system for controlling the positioning of a member including in combination, means for moving the member, a disc rotating in coordinated relation with the member and having spaced apertures therein, light means applying a beam of light on said disc which passes therethrough when an aperture is aligned with said light means, light sensitive means responding to light passing through said apertures for producing pulses, whereby a pulse is produced in response to each increment of movement of the member, counter means responsive to pulses and including a main counter having a plurality of stages representing digits of a number, each of said stages having a decatron tube including a plurality of terminals energized in turn as pulses are applied thereto, presettable means coupled to said terminals and responsive to energization thereof for causing operation when a predetermined count is reached, an auxiliary counter for providing a fixed count, means coupling said pulsing means to said main counter to apply pulses thereto upon each increment of movement of said member, gate means selectively coupling said pulsing means to said auxiliary counter, control means coupled to said moving means and causing the same to operate at fast and slow speeds and stopping the same, program means including a movable head having a plurality of switches with actuating elements extending therefrom and a tape positioned to be engaged by said actuating elements, said tape having sections with openings therein to receive predetermined ones of actuating elements, with the switches having actuating elements extending through said openings in said tape remaining unactuated and the switches having actuating elements engaging said tape being actuated, sequence means coupled to said program means and to said control means, said sequence means actuating said program means to cause movement of said head so that said actuating elements are spaced from said tape and for moving said tape to a desired position and then moving said head so that said actuating elements are in cooperative relation with said tape, certain ones of said switches being connected to said presettable means to set up a preset count, at least one of said switches being connected to said sequence means to cause operation of said control means to initiate a predetermined operation of said moving means, with said pulsing means applying pulses to said main counter upon each increment of movement of said member at the fast speed, said main counter actuating said control means to cause said moving means to operate at the slow speed when the preset count is reached, said gate means operating to apply pulses to said auxiliary counter during movement at slow speed, with said auxiliary counter actuating said control means to stop said moving means when the fixed count is reached.

15. A system for controlling the positioning of a member to be acted upon by work means including in combination, means for moving the member, pulsing means producing a pulse in response to each increment of movement of the member, counter means responsive to pulses and including a plurality of stages corresponding to the digits of a number and each having a plurality of operative conditions corresponding to the numerals of one digit, coincidence means responsive to all of said stages, means coupling said pulsing means to said counter means to apply pulses thereto upon each increment of movement of said member, program means coupled to said counter means and automatically controlling the connection of said stages to said coincidence means to set up a predetermined count, and control means coupled to said moving means for causing fast and slow operation of said moving means and stopping the same, said coincidence means being coupled to said control means and actuating the same to cause said moving means to change from fast to slow movement when the predetermined count set up is reached and to cause said moving means to stop when a further position is reached, said control means causing operation of the work means when said moving means stops.

16. A system for controlling the positioning of a member including in combination, means for moving the member, pulsing means producing a pulse in response to each increment of movement of the member, counter means responsive to pulses and including a plurality of stages representing the digits of a number and each having a plurality of operative conditions representing the numerals of one digit, program means coupled to said stages and automatically operative to select one of said conditions of each stage to thereby preset different numbers corresponding to different predetermined counts, means coupling said pulsing means to said counter means to apply pulses thereto upon each increment of movement of said member, and control means coupled to said counter means and to said moving means, said control means causing operation of said moving means and stopping the same, said counter means actuating said control means to cause said moving means to stop when the number preset by said program means is reached.

References Cited in the file of this patent

UNITED STATES PATENTS

| 2,537,427 | Seid et al. | Jan. 9, 1951 |
| 2,886,753 | Abbot | May 12, 1959 |
| 2,901,927 | Morgan | Sept. 1, 1959 |

OTHER REFERENCES

Publication: Transactions of the Society of Instrument Technology; pp. 37–52; June 1955.